United States Patent [19]

Ito

[11] 4,102,514
[45] Jul. 25, 1978

[54] MINIATURE TAPE CASSETTES

[75] Inventor: Kazuo Ito, Tokyo, Japan

[73] Assignee: Kabushiki Kaisha Daini Seikosha, Japan

[21] Appl. No.: 815,018

[22] Filed: Jul. 12, 1977

[30] Foreign Application Priority Data

Jul. 12, 1976 [JP] Japan .................................. 51/82731

[51] Int. Cl.$^2$ ............................................. G11B 23/10
[52] U.S. Cl. ..................................... 242/199; 29/453
[58] Field of Search ............... 242/199, 200, 198, 197, 242/71.2, 71.1, 55.53; 360/132, 96, 93; 197/151; 206/387, 409; 29/469

[56] References Cited

U.S. PATENT DOCUMENTS

| 2,742,241 | 4/1956 | Miller | 242/55.53 |
| 3,047,138 | 7/1962 | Anderson, Jr. | 242/55.53 |
| 3,520,495 | 7/1970 | Sotani | 242/199 |
| 3,837,599 | 9/1974 | Souza | 242/199 |
| 3,994,551 | 11/1976 | Ackeret | 206/387 |

Primary Examiner—George F. Mautz

Attorney, Agent, or Firm—Robert E. Burns; Emmanuel J. Lobato; Bruce L. Adams

[57] ABSTRACT

A miniature tape cassette comprises an integral one-piece drawn sheet metal casing having an upper wall, a lower wall and side walls, one side of the casing being opened. Aligned holes are provided in the upper and lower walls of the casing rotatably to receive hub portions of tape spools on which a magnetic tape is wound. The upper wall is provided with integral spring strips which extend from the holes toward a central portion of the open side of the casing. These spring strips flex outwardly to permit the insertion of the tape spools into the casing and then spring back into the plane of the upper wall so as to retain the tape spools in place. Guide rollers adjacent opposite ends of the casing and near the open side have axle portions that are received in slots provided in the upper and lower walls of the casing. Pads for pressing against the tape are provided at opposite ends of a leaf spring which is positioned in the casing by means of a pin having end portions received in the upper and lower wall. Small tab portions of the upper and lower walls at the open side of the casing are bent at right angles to provide guide elements for the tape.

8 Claims, 7 Drawing Figures

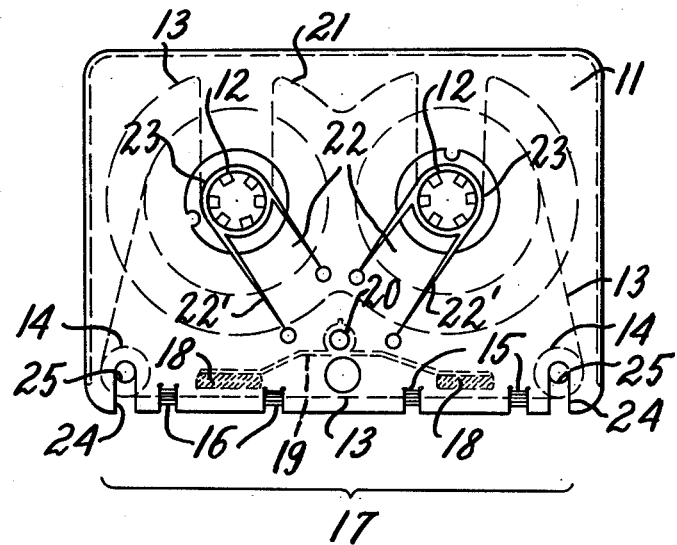
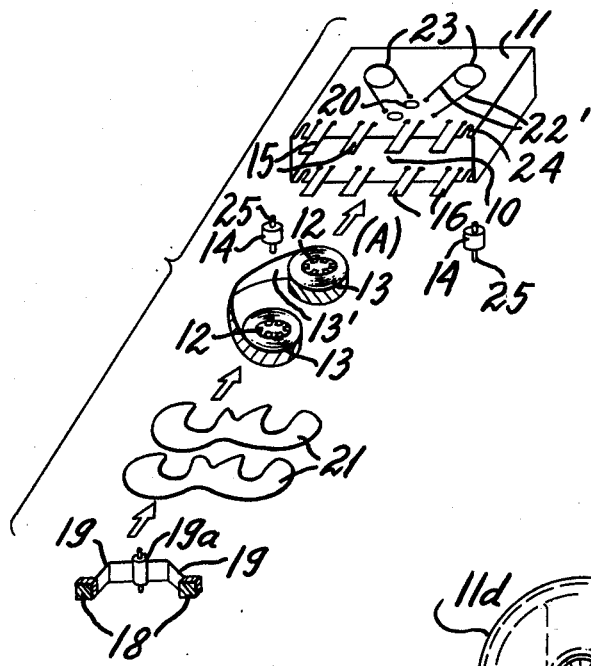
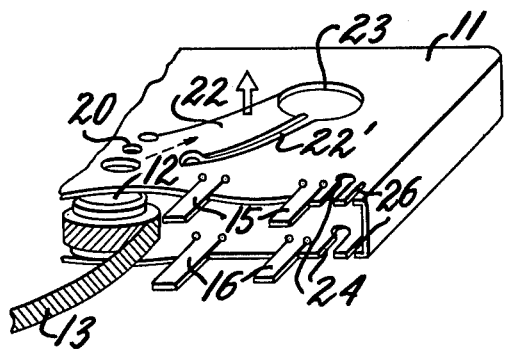
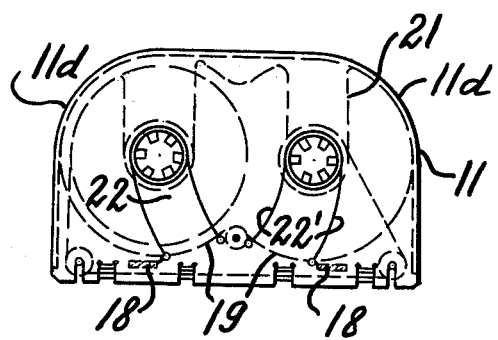

MINIATURE TAPE CASSETTES

FIELD OF INVENTION

The present invention relates to miniature tape cassettes and particularly to very small cassettes for tape recorders.

BACKGROUND OF THE INVENTION

A conventional tape cassette has a casing of plastic material which is made in two halves which are secured together by means of screws screwed into stationary posts provided near the corners of the cassette. In order to provide sufficient strength it is necessary for the walls of the plastic casing to be relatively thick so that it is difficult to make the cassette smaller than a standard size cassette.

As a means for eliminating the above noted difficulty and insufficiency, it has been proposed to form the cassette halves as thin metal plates which are secured together with normal screws and stationary posts. However, with this construction it is still necessary to provide screws and stationary posts for fixing the two halves of the cassette together. Moreover, the construction does not make possible small miniaturization.

SUMMARY OF THE INVENTION

It is an object of the present invention to eliminate the above noted difficulties and insufficiencies and to provide for miniaturization and cost reduction of tape cassettes.

In accordance with the invention, a miniature tape cassette comprises an integral one-piece drawn sheet metal casing having an upper wall, lower wall and side walls, one side of the casing being open. The upper wall and lower wall have aligned holes for rotatably receiving the hubs of tape spools inserted into the casing. Either the upper or lower wall of the casing is provided comprising forming integral spring strips extending from the holes for the tape spool hubs toward the open side of the casing. These strips flex outwardly to permit insertion of the tape spools with tape thereon from the open side of the casing and then spring back into the plane of the casing wall so as to retain the tape spools in place.

A further feature of the invention is that integral tabs are provided on the edge of at least one of the upper and lower walls at the open side of the casing. After the tape spools with the tape thereon have been inserted into the casing from the open side, these tabs are bent inwardly at right angles to the upper and lower walls so as to provide tape guiding elements.

Another feature of the invention is that slots are provided in the upper and lower walls of the casing near the ends of the casing. The slots extend inwardly from the open side of the casing. Axle portions of guide rollers which are inserted between the upper and lower walls after the tape spools are assembled in the casing and a portion of tape extending between the spools is looped out through the open side of the casing.

Still another feature of the invention is that an assembly comprising a leaf spring with pressure pads at opposite ends and a supporting pin at a midpoint is inserted into the casing from the open side after the tape spools with the tape thereon have been assembled in the casing. Ends of the pin are received in holes provided in the upper and lower walls so as to position the spring and pad assembly for engagement of the pads with the tape extending between the tape spools.

BRIEF DESCRIPTION OF DRAWINGS

The nature, objects and advantages of the invention will be more fully understood from the following description when taken in conjunction with the accompanying drawings in which:

FIG. 4 is an enlarged plan view of a tape cassette in accordance with the present invention, FIG. 5 is a schematic disassembled perspective view for explaining the assembly process of a tape cassette in accordance with the invention, FIG. 6 is an enlarged partial perspective view illustrating the assembly process, and FIG. 7 is a plan view of another embodiment of a tape cassette in accordance with the invention.

DESCRIPTION OF PRIOR CONSTRUCTIONS

Figure 1:
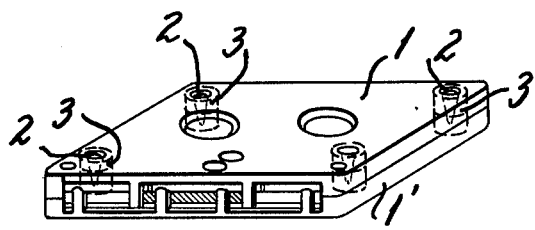
FIG. 1 is a perspective view of a conventional tape cassette.

A conventional type tape cassette shown by way of example in FIG. 1 comprises a pair of plastic cassette half members 1 and 1' which are secured together by means of screws 2 screwed into stationary post 3. The plastic material must be relatively thick in order to provide sufficient strength. With this construction it is difficult to miniaturize the cassette.

Figure 2:
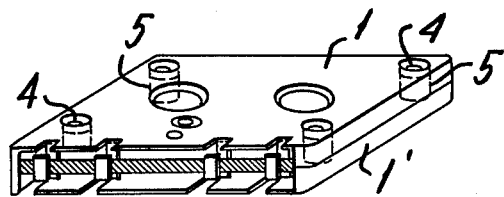
FIG. 2 is a perspective view showing a further prior construction.

In FIG. 2 there is shown a modified construction in which the cassette halves are composed of thin metal plates. However, as in the construction shown in FIG. 1, the two halves of the cassette are secured together by means of screw bolts 4 and stationary posts 5.

DESCRIPTION OF PREFERRED EMBODIMENTS

Figure 3:
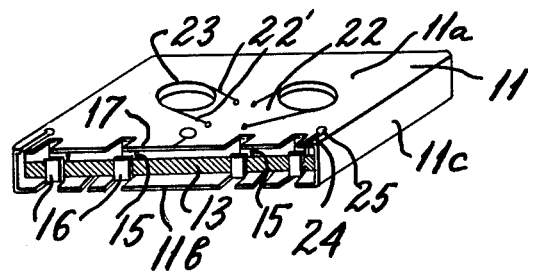
FIG. 3 is a perspective view of a tape cassette in accordance with the present invention.

A cassette in accordance with the present invention, as shown by way of example in FIGS. 3 and 4, comprises an integral one-piece drawn sheet metal casing 11 having an upper wall 11a, lower wall 11b and side walls 11c, one side of the casing being open. The upper and lower walls of the casing are provided with aligned holes 23 to receive hub portions of tape spools 12 on which is wound a tape 13 which extends between the two spools. In going from one spool to the other, the tape 13 is guided by rotary rollers 14 which are located near the open side of the casing and near opposite ends of the casing. Tape guide elements 15 and 16 at the open side of the casing are formed as integral tabs on the upper and lower walls. The tape guide elements 15 are formed on the upper wall of the casing and are inside the tape extending between the two tape spools while the guide element 16 are formed on the lower wall of the casing and are positioned outside the tape.

Pads 18 are resiliently supported by a leaf spring member 19 which is mounted in the casing by means of a central pin 19a having end portions received in holes in the upper and lower walls of the casing. Slipping films 21 of low friction material are inserted between the inner face of the casing and the tape 13.

A process for making a miniature tape cassette in accordance with the present invention will now be explained with reference to FIGS. 5 and 6.

FIG. 5 shows in detail the structure of a tape cassette as described with reference to FIGS. 3 and 4. The cassette casing 11 is made in one piece of sheet metal, for example aluminum, by a drawing process, a heat treating process and a surface treating process. It is of rectangular shape with one open side 10. Aligned holes 23 are provided in the upper and lower walls of the casing to receive hub portions of the tape spools. The spring strips 22 defined by cut portions 22' in the upper wall of the casing extend from the holes 23 toward a central portion of the open side 10 of the casing. The spring strips 22 have a width approximately equal to the diameter of the holes 23. At the open side 10 of the casing, the upper and lower walls are provided with tabs 15 and 16 which are not bent.

First of all one tape spool 12 having a rolled tape 13 thereon is inserted into the cassette casing through the open side 10 as indicated by the arrow A in FIG. 5. The hub portions of the tape spool 12 push central portions of the upper and lower walls of the casing apart to receive the tape spool. The central portions of the upper and lower walls of the casing are the weakest portions and can readily be flexed. As the tape spool is pushed into the casing toward one pair of holes 23, the spring strip member 22 flexes to permit passage of the tape spool. One end portion of the spring strip member 22 is integral with the cassette casing 11 in the neighborhood of the open side 10 while the other end portion of the spring strip member 22 is shaped as a free end portion having a spring force which is obtained by the cut portion 22' being shaped as seen in FIGS. 3 to 6. Therefore, the tape spool 12 is inserted along the strip member 22 until its hub portions are rotatably received in the holes 23. The other tape spool 12 which is connected to the first mentioned tape spool by the magnetic tape 13 is similarly mounted in the other pair of holes 23 whereby both tape spools are rotatably mounted in the casing by their portions being received in holes 23 in the upper and lower walls.

A pair of slipping film members 21, 21 are inserted into air gaps between the upper and lower surfaces of the magnetic tape and the inside surfaces of the cassette casing 11. The magnetic tape 13 extending between the two tape spools is pulled out from the open portion 10 of the casing so as to extend in a loop. Guide rollers 14 are then inserted into the casing from the open side 10. The guide rollers 14 are made of synthetic resin material and are rotatably mounted in the casing by axle portions 25 received in slits 24 provided in the edges of the upper and lower walls of the casing at the open side 10. The roller axles 25 are larger than the roller slits 24. However, the roller axles 25 are smoothly mounted in the slits since the roller axles are made of synthetic resin material. The inner ends of the slits 24 are made slightly larger to permit free rotation of the rollers 14. To facilitate insertion of the rollers and avoid any damage to the roller axles, a slot 26 is provided along side the roller slot 24. The rollers 14 are adapted to engage the tape material surface 13' of the magnetic tape 13.

While the magnetic tape is still looped out from the open side of the casing, the pad assembly comprising pads 18, spring 19, and pin 19a is inserted into the casing from the open side and retained in position by end portions of the pin 19a being received in aligned holes in the upper and lower walls of the casing. Finally, the tape guide elements 15 are bent inwardly at right angles to the upper wall whereby the open portion 10 of the casing is partly closed. The magnetic tape is then disposed straight along the open side 10 by rotating one tape spool. The other tape guide members 16 are then bent inwardly at right angles so that the tape lies between the guide members 15 and the guide members 16. The tape guide members 15 face the tape base material surface 13' of the magnetic tape 13 while the other tape guide members 16 face the magnetic material surface of the magnetic tape 13 whereby the magnetic tape 13 is guided between the tape guide members 15 and 16.

As shown by way of example in the drawings, the tape guide members 15 and 16 have respectively guide portions on one side thereof. However, it is possible to guide the tape in a width direction by bending the tape guide members twice so as to engage the edges of the tape.

Another embodiment of the invention is shown by way of example in FIG. 7 in which the same numerals refer to the same portions as in the embodiment of FIGS. 3 to 6. According to the embodiment of FIG. 7 unnecessary corner portions of the casing are removed to provide rounded corners 11d. This rounding is made possible by the fact that stationary corner posts are not necessary.

In FIG. 7 each of the spring strips 22 defined by cuts 22' is shaped as an arc of a circle with a center at the center of the other hub whereby the tape spools are smoothly mounted without relation to the diameter of the tape wound on the tape spool. Further, the spring member 19 supporting the pads 18 is prolonged along the arcs of circles concentric with the hub holes 23 whereby an effective spring length is obtained.

According to the present invention a tape cassette casing which is made of sheet metal by a mechanical drawing process is very strong and uniform and eliminates the need of stationary posts and supporting portions whereby it is possible to minimize the size of the cassette casing. Moreover, assembly of the cassette is very easy whereby production costs are low. A cassette in accordance with the present invention is very attractive by reason of the metallic finish and absence of connections. Further, it is possible to shield the magnetic tape from magnetic and electrical influence. It is accordingly possible by the present invention to make a tape cassette much smaller than the conventional type.

What is claimed is:

1. A minature tape cassette comprising an integral one-piece drawn sheet metal casing having an upper wall, lower wall and side walls, one side of said casing being open, said upper wall and lower wall having aligned holes for rotatable receiving hubs of tape spools, and tape spools with tape thereon disposed between said upper wall and lower wall with the hubs thereof rotatably received in said holes, one of said upper wall and lower wall having integral spring strips extending from said holes toward said open side of said casing for insertion of said spools into said casing from the open side thereof for reception of said hubs in said holes.

2. A minature tape cassette according to claim 1, in which at least one of said upper wall and lower wall has at the open side of said casing integral tab portions bent upwardly at right angles to said upper and lower walls and constituting tape guides.

3. A minature tape cassette according to claim 1, further comprising guide rollers having axle portions received in slots in said upper and lower walls extending in from said open side of the cassette.

4. A minature tape cassette according to claim 1, further comprising pads for engagement with said tape between said spools, a leaf spring supporting said pads and a pin having end portions received in holes in said upper and lower walls to position said spring and pads between said upper and lower walls near the open side of the casing.

5. A method of making a minature tape cassette comprising the steps of forming an integral one-piece drawn sheet metal casing having an upper wall, lower wall and side walls, one side of said casing being open, providing aligned holes in said upper and lower walls to receive hubs of tape spools, forming in one of said upper and lower walls integral spring strips extending from said holes toward said open side of said casing and inserting between said upper and lower walls tape spools having tape thereon and having hub portions for reception rotatably in said holes, said spools being inserted into said casing along paths defined by said spring strips which flex to permit passage of said spools and then spring back into the plane of the respective wall of the casing to retain said spools in proper position in the casing.

6. A method of making a minature tape cassette according to claim 5, further forming integral tabs on at least one of said upper and lower walls at the open side of the casing and, after insertions of said tape spools with the tape into the casing, bending said tabs inwardly at right angles to said upper and lower walls to constitute tape guides.

7. A method of making a minature tape cassette according to claim 5, further comprising providing slots in the edges of said upper and lower walls at the open side of said casing and after insertion of said tape spools with the tape into the casing, looping the tape out of the open side of the casing and inserting guide rollers between said upper and lower walls with axle portions received in said slots.

8. A method of making a minature tape cassette according to claim 5, further comprising providing an assembly comprising a leaf spring with pads on opposite ends thereof and a pin at a midportion of said leaf spring and, after insertion of said tape spools with the tape into the casing, looping the tape out of the open side of the casing and inserting said leaf spring, pads and pin assembly between said upper and lower walls from the open side of the casing, ends of said pin being received in holes in said upper and lower walls.

* * * * *